(12) United States Patent
Gamperl et al.

(10) Patent No.: US 10,143,047 B2
(45) Date of Patent: Nov. 27, 2018

(54) LIGHTING CONTROL SYSTEM AND METHOD FOR GENERATING SUPPLY CURRENTS FOR LED CHANNELS

(71) Applicant: Dialog Semiconductor (UK) Limited, London (GB)

(72) Inventors: David Gamperl, Hartberg (AT); Manfred Pauritsch, Graz (AT); Herbert Truppe, Graz (AT)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 15/561,965

(22) PCT Filed: Mar. 16, 2016

(86) PCT No.: PCT/EP2016/055680
§ 371 (c)(1),
(2) Date: Sep. 26, 2017

(87) PCT Pub. No.: WO2016/156044
PCT Pub. Date: Oct. 6, 2016

(65) Prior Publication Data
US 2018/0116016 A1    Apr. 26, 2018

(30) Foreign Application Priority Data

Mar. 27, 2015 (EP) .................... 15161297

(51) Int. Cl.
*H05B 33/08* (2006.01)
*H05B 37/02* (2006.01)

(52) U.S. Cl.
CPC ..... *H05B 33/0809* (2013.01); *H05B 37/0281* (2013.01); *Y02B 20/42* (2013.01)

(58) Field of Classification Search
None
See application file for complete search history.

(56) References Cited

U.S. PATENT DOCUMENTS

2009/0079359 A1    3/2009   Shteynberg et al.
2009/0284459 A1    11/2009  Wallener et al.
(Continued)

FOREIGN PATENT DOCUMENTS

| WO | 2007023454 A1 | 3/2007 |
|---|---|---|
| WO | 2008000465 A1 | 1/2008 |
| WO | 2011058687 A1 | 5/2011 |

*Primary Examiner* — Jany Richardson
(74) *Attorney, Agent, or Firm* — Saile Ackerman LLC; Stephen B. Ackerman

(57) ABSTRACT

A lighting control system (LCS) for generating supply currents for at least two LED channels (CH1, CH2, CHn) comprises at least two controlled current sources for generating a supply current for a corresponding LED channel based on a corresponding control signal. The system further comprises at least two signal combiners for generating the corresponding control signals based on a synchronization signal (VSYNC) that comprises periodic starting pulses and on a combination of a magnitude dimming signal and a pulse dimming signal corresponding to one of the LED channels. The signal combiners are designed such that changes of the respective control signals come into effect only with a respective time offset with respect to one of the starting pulses of the synchronization signal.

24 Claims, 2 Drawing Sheets

(56) References Cited

U.S. PATENT DOCUMENTS

| | | |
|---|---|---|
| 2010/0020004 A1 | 1/2010 | Smith |
| 2012/0019160 A1 | 1/2012 | Lee et al. |
| 2012/0212146 A1* | 8/2012 | Hwang .............. H05B 33/0827 |
| | | 315/210 |
| 2014/0139131 A1 | 5/2014 | Park et al. |
| 2014/0333859 A1 | 11/2014 | Zhang et al. |
| 2015/0116379 A1* | 4/2015 | Lim .................... G09G 3/3406 |
| | | 345/691 |

* cited by examiner

LIGHTING CONTROL SYSTEM AND METHOD FOR GENERATING SUPPLY CURRENTS FOR LED CHANNELS

BACKGROUND OF THE INVENTION

The present disclosure relates to a lighting control system and to a method for generating supply currents for at least two LED channels. Such LED channels may be particularly used for driving segmented LED backlights.

Conventional displays produce white background illumination either by a cold cathode tube, white light-emitting diodes, LEDs, or by a combination of red, green and blue LEDs. Because of their fast turn-on time, backlights with LEDs allow control of the brightness by means of pulse modulation. Such LED backlights will be considered further here.

For subjective increase of contrast, the LED backlighting of a display is typically subdivided into segments, each with its own driving and thus its own brightness control. The task of determining the brightness is conventionally performed by a digital video processor. The segments are conventionally driven by means of pulse modulated signals. However, with the use of conventional pulse modulation techniques, a dynamic range of the desired brightness may be insufficient, in particular in view of backlight systems for 4K or UHD TV sets. For example, the high dynamic range, HDR, specification requires an increased dynamic range for the brightness.

SUMMARY OF THE INVENTION

The present disclosure provides an improved concept for controlling LED channels with an improved dynamic range for the brightness to be achieved.

The improved concept is based on the idea that supplying a plurality of LED channels with individual supply currents is not only based on the width of a pulse-width modulated signal but also on a magnitude of such pulses. Hence, the resulting supply currents are not only defined by the time during which this current is supplied to the LED channel but also by an individual current value. To this end for each of the LED channels an individual pulse dimming signal and an individual magnitude dimming signal are provided, which are the basis the for the current generation. Furthermore, for each of the LED channels to be supplied, an individual time offset with respect to a common synchronization signal like a vertical sync, VSYNC, is provided. Changes of the supply currents come only into effect with the respective time offset of the LED channel to be supplied. Hence, negative effects on neighboring channels when brightness parameters for this channel change, can be avoided. For example, both the magnitude dimming signal and the pulse dimming signal for each channel are synchronized with the synchronization signal, taking into account the respective time offset.

For example, an external video processor provides a brightness value for each of the LED channels. The respective magnitude dimming signals and pulse dimming signals may be generated from these brightness values by a single processing unit. Hence, an efficient combination of pulse width and magnitude of the pulsed supply current can be achieved without influencing other channels.

In an embodiment of a lighting control system according to the improved concept supply currents for a first LED channel and at least a second LED channel are generated. For example, supply currents for a plurality of LED channels are generated. The system comprises a first controlled current source for generating a first supply current for the first LED channel based on a first controlled signal, and, similarly, a second controlled current source for generating a second supply current for the second LED channel based on a second control signal. The system further comprises a first signal combiner for generating the first controlled signal based on a synchronization signal that comprises periodic starting pulses and on a combination of a first magnitude dimming signal and a first pulse dimming signal. Similarly, a second signal combiner is provided for generating the second control signal based on the synchronization signal and on a combination of a second magnitude dimming signal and a second pulse dimming signal. The first and the second signal combiner are designed such that changes of the respective first and second control signals come into effect only with a respective time offset with respect to one of the starting pulses of the synchronization signal.

For example, the time offset for the first signal combiner is different from the time offset for the second signal combiner. More generally speaking, if a plurality of LED channels is to be supplied, a dedicated signal combiner and a dedicated controlled current source are provided for each of the LED channels to be supplied. In this case, the time offset is different for each of the signal combiners.

For example, all of the control signals generated by the signal combiners are pulse-width modulated signals that are defined by a pulse amplitude, which depends on the respective magnitude dimming signal, and by a pulse duration, which depends on the respective pulse dimming signal.

Furthermore, for example, all of the control signals generated by the signal combiners have a common cycle length for each of the starting pulses, and each of the control signals has an individual cycle start that is determined by the respective time offset for that control signal. One cycle may be defined by the time between two starting pulses of the synchronization signal. However, this cycle length may vary with possible changes of the synchronization signal. The cycle start of each control signal may be defined by a transition from a first state to a second state, the second state resulting in a current being produced by the associated controlled current source. In other words, the cycle start may be defined by the time instant when the supply current flows with a desired amplitude.

According to some of such implementations, a change of the pulse amplitude of each one of the control signals comes only into effect with a respective cycle start of said control signal.

In some implementations, a ratio between the pulse duration of each control signal and a cycle length of said control signal is less than or equal to one. Such a ratio may be expressed as a duty cycle of the respective control signal. If the ratio is less than one, there are time periods in the control signal, respectively the supply current, where the control signal, respectively the supply current, returns to a zero value or to another predefined basis value.

However, if the ratio is equal to one, there are no such zero phases and the value of the control signal, respectively the resulting supply current, is only determined by the magnitude dimming signal for the associated LED channel. In other words, a mere analog control of the supply current may be performed this way. However, also in this case, changes come only into effect with the respective time offset for said LED channel. Hence, each of the LED channels finds a change of the respective magnitude dimming signal to come into effect at different times that are defined by the respective time offsets of the channels.

In some implementations each of the signal combiners is designed for generating a respective analog amplitude signal based on the respective magnitude dimming signal, and for generating a respective pulse switching signal based on the respective pulse dimming signal, on the synchronization signal and on the respective time offset. The respective control signal is generated by modulating said analog amplitude signal with said pulse switching signal. For example, the modulation is performed by switching on and off the analog amplitude signal based on the state of the pulse switching signal. For example, the analog amplitude signal is generated by a digital-to-analog converter, DAC, based on a digital magnitude dimming signal.

In the various embodiments, the time offset for each channel may be preset for each of said signal combiners. For example, the time offset is preset once only in a production phase of the control system, or in an initialization phase, e.g. at the start-up of the control system in each case.

In some implementations, the lighting control system according to the improved concept further comprises a signal processing unit for generating a set of pairs of a magnitude dimming signal and a pulse dimming signal based on a set of brightness values for a plurality of LED channels to be supplied. With respect to the above explanations, for example a first pair of said set includes the first magnitude dimming signal and the first pulse dimming signal, and a second pair of said set includes the second magnitude dimming signal and the second pulse dimming signal.

In some of such implementations, the signal processing unit generates one pair of magnitude dimming signal and pulse dimming signal for each brightness value provided. In other words, the set of pairs and the set of brightness values are equinumerous.

In an alternative implementation the signal processing unit is configured to generate said set of pairs based on a predefined subset of the set of brightness values, such that said set of pairs and said subset are equinumerous. For example, if the lighting control system has a predefined, limited number of supply outputs for such a number of LED channels, and the number of brightness values, respectively LED channels, to be supplied is higher, two or more of such lighting control systems may be operated together such that each of the lighting control systems is dedicated to a specific sub-set of the full set of brightness values. The distribution of brightness values to different lighting control systems may be controlled by pre-programming or by providing additional control information.

In view of the above description of the lighting control system and its various embodiments, also a method for generating supply currents for supplying a plurality of LED channels according to the improved concept is provided. The method comprises, for each of the LED channels to be supplied, generating a control signal for said LED channel based on a synchronization signal, which comprises periodic starting pulses, and on a combination of a magnitude dimming signal for said LED channel and a pulse dimming signal for said LED channel. Changes of said control signal come into effect only with a defined time offset with respect to one of the starting pulses of the synchronization signal. A supply current for said LED channel is generated by means of a controlled current source dedicated to said LED channel based on said control signal.

Various embodiments of such a method become apparent for the skilled reader from the description of the various embodiments of the lighting control system above.

Several exemplary embodiments according to the improved concept are described in greater detail below with reference to the figures. In the figures, elements with identical function or meaning are identified by the same reference symbols. Hence, such elements may not be described repeatedly.

DETAILED DESCRIPTION

Figure 1:
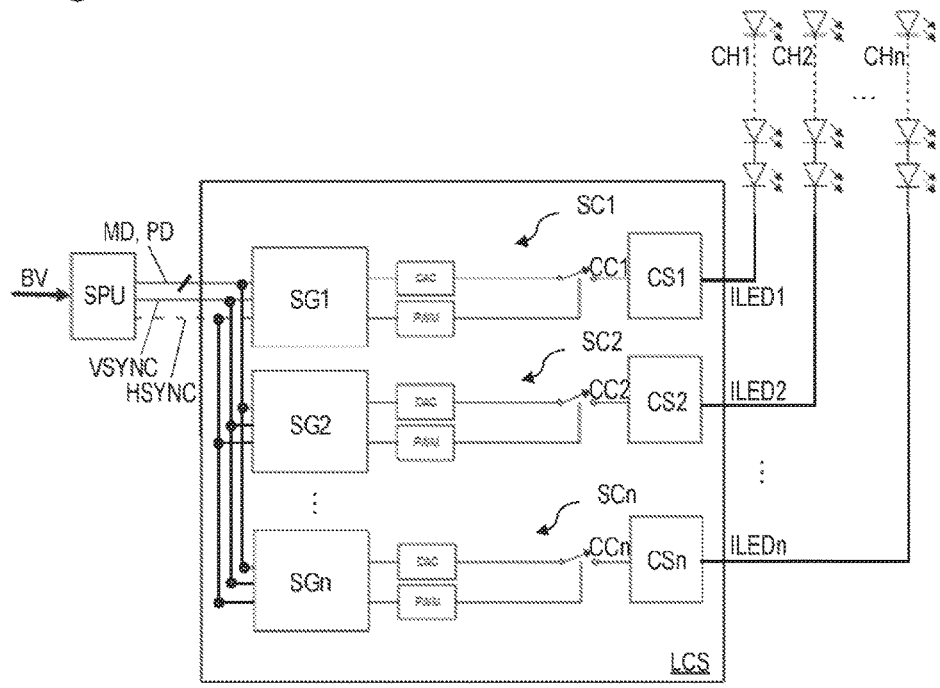
FIG. 1 shows an example implementation of a lighting control system with LED channels to be supplied.

FIG. 1 shows an example embodiment of a lighting control system LCS according to the improved concept that is designed for providing supply currents ILED1, ILED2, . . . , ILEDn to a plurality of LED channels CH1, CH2, . . . , CHn. For example, the LED channels are part of a backlight of a liquid crystal display, LCD, wherein each LED channel is dedicated to a defined area of the display. For example, such a display may be part of a 4K TV set or ultrahigh definition, UHD, TV set. Hence, the lighting control system LCS may be a backlight control system for such applications.

The lighting control system LCS comprises, for each of the LED channels CH1, CH2, . . . , CHn to be supplied, a respective controlled current source CS1, CS2, . . . , CSn and an associated signal combiner SC1, SC2, . . . , SCn. The signal combiners SC1, SC2, . . . , SCn are provided with a first synchronization signal VSYNC and, optionally, with a second synchronization signal HSYNC. Furthermore, each of the signal combiners receives a pair of dimming signals that is individual for each signal combiner. In particular, each of said pairs comprises a magnitude dimming signal and a pulse dimming signal. Such a set of pairs is denoted with MD, PD in FIG. 1. The set of pairs MD, PD may be provided by a signal processing unit SPU that is designed for generating the respective pairs of magnitude dimming signal and pulse dimming signal from respective brightness values BV provided at an input of the signal processing unit SPU. This will be explained in greater detail below in conjunction with FIG. 4.

Each of the signal combiners SC1, SC2, . . . , SCn is configured for generating a respective control signal CC1, CC2, . . . , CCn that controls the respective controlled current source CS1, CS2, . . . , CSn for the associated channel. The generation of said control signals is based on the synchronization signal VSYNC that comprises periodic starting pulses and on a combination of the magnitude dimming signal and the pulse dimming signal of said channel.

The synchronization signal VSYNC may be the vertical synchronization signal of a video image that separates video fields, e.g. two images to be displayed. The periodic starting pulses of the synchronization signal may be indicating the beginning of a new image, for example.

For each of the signal combiners SC1, SC2, . . . , SCn there is a specific time offset defined. Such time offset may be dependent on a time sequence of areas to be illuminated by the various LED channels CH1, CH2, . . . , CHn. In particular, the time offsets of all channels may be different. The signal combiners are designed such that changes of their output, namely the respective control signals CC1, CC2, . . . , CCn, come into effect only with the respective time offset of said channel with respect to one of the starting pulses of the synchronization signal VSYNC. For example, in each cycle of the synchronization signal VSYNC, defined by a respective starting pulse and the following starting pulse, any changes to the control signal come only into effect at a time instant defined by the starting pulse plus the associated time offset of said channel.

Figure 2:
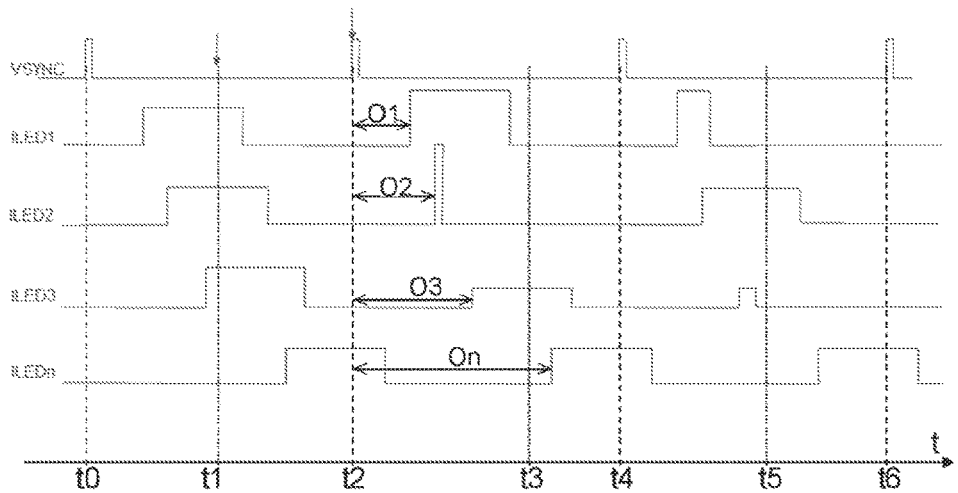
FIG. 2 shows an example time signal diagram in an example implementation of the improved concept.

Referring now to FIG. 2, this figure shows a time signal diagram of the synchronization signal VSYNC and supply currents ILED1, ILED2, ILED2 and ILEDn. Further supply currents are left out in this diagram for reasons of a better overview. Respective starting pulses of the synchronization signal VSYNC are present at time instants t0, t2, t4 and t6, each of the starting pulses indicating the beginning of a new signal period, e.g. a new image frame.

The supply currents shown in FIG. 2 are formed of pulse signals, in particular pulse width modulated signals with a specific pulse width and a specific magnitude for each LED channel and each signal period. Each of the pulses starts an offset time O1, O2, O3, On after the starting pulse of the synchronization signal VSYNC. For example, the first supply current ILED1 has a time offset of O1, the second supply current ILED2 has a time offset of O2, the third supply current ILED3 has a third time offset of O3 and the $n^{th}$ supply current ILEDn has an $n^{th}$ time offset On.

For example, at the time instant t1 a new pair of dimming signals, namely a magnitude dimming signal and a pulse dimming signal, is provided for each of the LED channels to the corresponding signal combiner. However, as can be seen from FIG. 2, the changes do not come into effect immediately but only with the beginning of the next pulse of the supply current after the following starting pulse of the synchronization signal VSYNC at time t2. Moreover, with respect to the last, $n^{th}$ channel with supply current ILEDn, the current pulse around time instant t2 belongs to the previous signal period and the changes provided at t1 only become apparent at the time t2+On, thus after the time instant t3. For example, at the time instants t3 and t5 new respective sets of pairs of magnitude dimming signals and pulse dimming signals may be provided to the system.

With respect to the second supply current ILED2 in FIG. 2, it should be noted that the signal generation according to the improved concept also makes it possible to provide boosted current pulses with a relatively short pulse width and a relatively high magnitude. For example, for such short boost pulses it may also be possible to drive the LED channel with a current that is two to four times higher than a current allowed for continuous operation of the LED channel. However, the actual boosting factor depends on the specific application or implementation and is not limited to the given example.

It should be further noted that the pulse width and pulse magnitude of each of the supply currents can be set individually for each signal period defined by the synchronization signal VSYNC and for each LED channel separately. The time offsets O1, O2, O3, . . . , On may be predefined based on the application and implementation of the LED channels. For example, in the application of a backlight system for an LCD, the offset times may be defined by the position of the LED channel and the time at which an image is displayed on the LCD at said position. Hence, image display and backlighting are synchronized. Furthermore, the desired brightness for each image frame at each position can be controlled efficiently and with little or no influence on neighboring channels according to the improved concept.

Referring back to FIG. 1, the control signals CC1, CC2, . . . , CCn generated by the signal combiners SC1, SC2, . . . , SCn are pulse width modulated signals that are defined by a pulse amplitude, which depends on the respective magnitude dimming signal, and by a pulse duration, which depends on the respective pulse dimming signal, as shown in the diagram of FIG. 2. Furthermore, all of the control signals generated by the signal combiners have a common cycle length for each of the starting pulses.

As shown in the diagram of FIG. 2, preferably each one of the controlled signals has an individual cycle start that is determined by the respective time offset for said controlled signal. Hence, a change of the pulse amplitude of each one of the control signals and, as a consequence, of the resulting supply currents, comes only into effect with a respective cycle start of said control signal. For example, controlled current sources are formed of voltage controlled current sources, which may be implemented by a transistor, in particular a field-effect transistor, having a controlled current throughput depending on its control voltage. However, other forms of controlled current sources are well-known in the art.

FIG. 1 further shows an example implementation for each of the signal combiners. In this example implementation, each signal combiner comprises a signal generator SG1, SG2, . . . , SGn having two outputs, of which one controls a digital-to-analog converter DAC and of which the other controls a pulse-width modulation generator PWM. Accordingly, the signal generator in conjunction with the DAC generates an analog amplitude signal based on the respective magnitude dimming signal, and in conjunction with the PWM generator generates a pulse switching signal based on the respective pulse dimming signal. Furthermore, these signal generations preferably are dependent on at least one of the synchronization signal VSYNC and on the respective time offset for the associated channel.

For example, the time offset may be stored in the signal generator. For example, the time offset may be applied using the optional horizontal synchronization signal HSYNC, which separates scan lines by respective pulses. For example, the synchronization signal HSYNC has single short pulses which indicate the start of every line. Hence, the time offset for each channel may be expressed and/or implemented in the form of a number of sync pulses of the second synchronization signal HSYNC.

Having generated the analog amplitude signal and the associated pulse switching signal, the resulting control signal may be generated by modulating said analog amplitude signal with said pulse switching signal. For example, in the embodiment of FIG. 1, this is done by controlling a switch that carries the analog amplitude signal with the pulse switching signal.

It should be noted that the example implementation of FIG. 1 with respect to the signal combiners SC1 is only one of many possible options to generate the control signals. Without going into detail, the control signals may also be generated by producing the pulsed signals as a digital signal in a digital signal processor and converting them into analog form by means of respective digital-to-analog converters.

Figure 3:
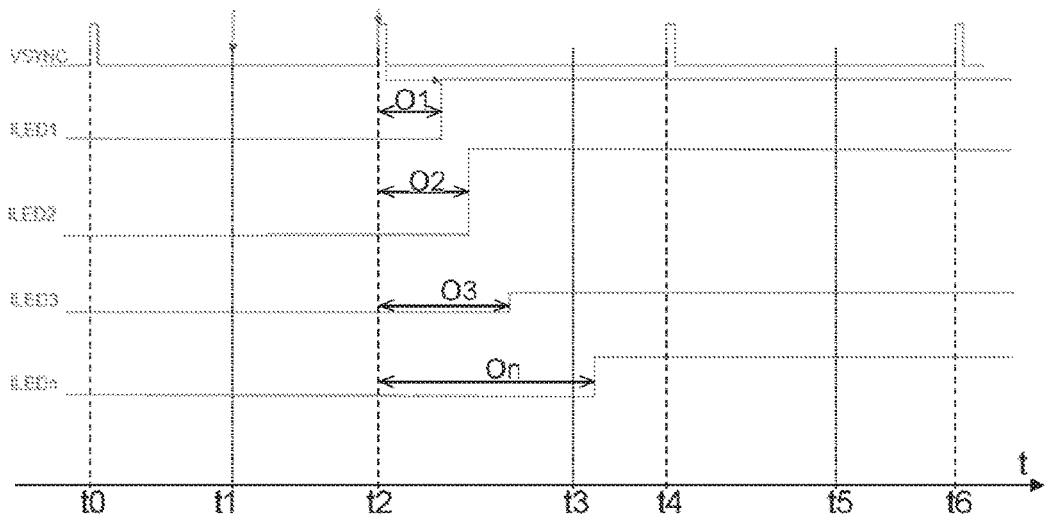
FIG. 3 shows a further example time signal diagram in an example implementation of the improved concept.

Referring now to FIG. 3, this figure shows another time signal diagram of the synchronization signal VSYNC and supply currents, as in FIG. 2. However, in contrast to the signals of FIG. 2, the supply currents are not provided as a pulsed signal having zero value phases or defined low value phases but have fixed values throughout each cycle.

For example, as described for FIG. 2, at the time instants t1 new pairs of pulse dimming signal and magnitude dimming signal are provided, wherein the pulse dimming signals indicate a ratio between the pulse duration of each control signal and a cycle length of said control signal to be equal to one. In other words, the effective value of the supply current is only determined by the magnitude dimming signal.

However, as described before for FIG. 2, the changes provided at instant t1 come only into effect after the respective time offsets O1, O2, O3, On after the next starting pulse of the synchronization signal VSYNC at time instant t2.

Referring back to FIG. 1, the lighting control system LCS can both be used for control applications, where a pulse duration is varied based on the pulse dimming signal or remains unvaried, thus always being on, depending on a specific pulse dimming signal. In both cases, the synchronization of the magnitude dimming signal with respect to the time offset is performed.

Figure 4:
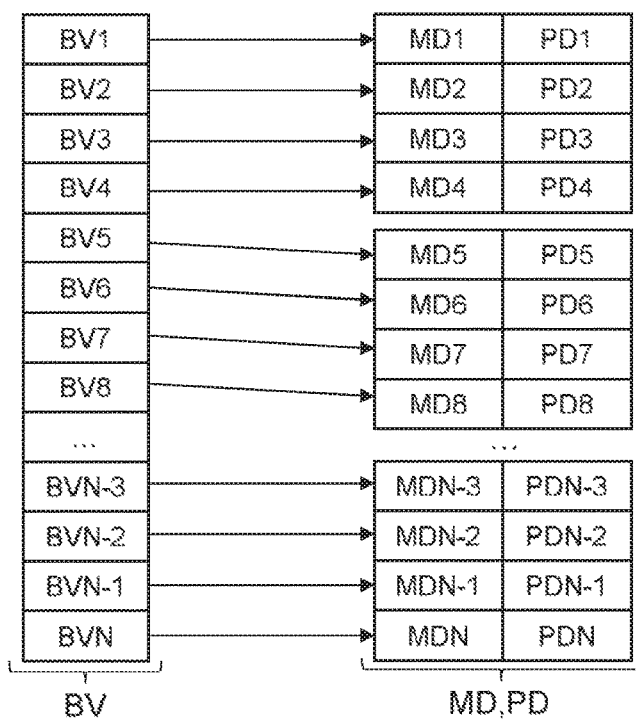
FIG. 4 shows an example implementation of signal processing according to the improved concept.

Referring now to FIG. 4, as indicated above, the signal processing unit SPU may be designed for generating a set MD, PD of pairs of a magnitude dimming signal and a pulse dimming signal based on a set BV of brightness values for a plurality of LED channels to be supplied. In some implementations the generation of the set MD, PD may be based on a predefined subset of the set BV, such that only the subset of brightness values is used for generating corresponding pairs of magnitude dimming signals and pulse dimming signals.

Preferably, the cardinality of such a subset corresponds to the number of LED channels to be supplied by one instance of a lighting control system. For example, if the cardinality of the set BV of brightness values is higher than the number of channels that can be supplied by one instance of a lighting control system, several instances of such lighting control systems may be operated so to say in parallel, each lighting control system operable for supplying a different set of LED channels. The signal processing unit may be integrated into the lighting control system or may be external to the lighting control system. Each instance of a lighting control system may be implemented in a separate semiconductor chip package, with or without the signal processing unit.

FIG. 4 describes the function of the signal processing unit with respect to the generation of the set MD, PD of pairs of magnitude dimming signals and pulse dimming signals from a set BV of brightness values. In particular, in the example implementation of FIG. 4, several subsets of cardinality 4 are formed in the set BV, and each subset is used for generating a respective set of four pairs of magnitude dimming signals and pulse dimming signals. In particular, the first subset consisting of brightness values BV1, BV2, BV3, BV4 is evaluated to generate the set of pairs with respective magnitude dimming signals MD1, MD2, MD3, MD4 and pulse dimming signals PD1, PD2, PD3, PD4. In the same fashion, the subset with the brightness values BV5 to BV8 is processed to pairs MD5, PD5 to MD8, PD8.

In the present example, the set BV consist of N elements of brightness values, resulting in the same number of pairs. More generally speaking, each predefined subset of the brightness values is equinumerous to the corresponding set of pairs. It should be noted that the number of elements of each subset being 4 has been chosen for explanatory reasons only and could be greater or less, depending on the number of LED channels that can be supplied by the lighting control system, in particular one instance of a lighting control system.

The invention claimed is:

1. A lighting control system for generating supply currents for a first LED channel and at least a second LED channel, the system comprising
   a first controlled current source for generating a first supply current for the first LED channel based on a first control signal;
   a second controlled current source for generating a second supply current for the second LED channel based on a second control signal;
   a first signal combiner for generating the first control signal based on a synchronization signal that comprises periodic starting pulses and on a combination of a first magnitude dimming signal and a first pulse dimming signal; and
   a second signal combiner for generating the second control signal based on the synchronization signal and on a combination of a second magnitude dimming signal and a second pulse dimming signal; wherein
   the first and the second signal combiner are designed such that changes of the respective first and second control signals come into effect only with a respective time offset with respect to one of the starting pulses of the synchronization signal.

2. The lighting control system according to claim 1, wherein the time offset for the first signal combiner is different from the time offset for the second signal combiner.

3. The lighting control system according to claim 1, wherein all of the control signals generated by the signal combiners are pulse-width modulated signals that are defined by a pulse amplitude, which depends on the respective magnitude dimming signal, and by a pulse duration, which depends on the respective pulse dimming signal.

4. The lighting control system according to claim 3, wherein all of the control signals generated by the signal combiners have a common cycle length for each of the starting pulses, and each one of the control signals has an individual cycle start that is determined by the respective time offset for said control signal.

5. The lighting control system according to claim 4, wherein a change of the pulse amplitude of each one of the control signals comes only into effect with a respective cycle start of said control signal.

6. The lighting control system according to claim 3, wherein a ratio between the pulse duration of each control signal and a cycle length of said control signal is less than or equal to one.

7. The lighting control system according to claim 1, wherein the synchronization signal is a vertical synchronization signal of a video image separating video fields.

8. The lighting control system according to claim 1, wherein each of the periodic starting pulses of the synchronization signal indicates a beginning of a new signal period, in particular of a new image frame.

9. The lighting control system according to claim 1, wherein each of the signal combiners is designed for generating a respective analog amplitude signal based on the respective magnitude dimming signal, for generating a respective pulse switching signal based on the respective pulse dimming signal, on the synchronization signal and on the respective time offset, and for generating the respective control signal by modulating said analog amplitude signal with said pulse switching signal.

10. The lighting control system according to claim 1, wherein the time offset is preset, once-only or in an initialization phase, for each of said signal combiners.

11. The lighting control system according to claim 1, further comprising a signal processing unit for generating a set of pairs of a magnitude dimming signal and a pulse dimming signal, a first pair of said set including the first magnitude dimming signal and the first pulse dimming signal and a second pair of said set including the second magnitude dimming signal and the second pulse dimming signal, based on a set of brightness values for a plurality of LED channels to be supplied.

12. The lighting control system according to claim 11, wherein the signal processing unit is configured to generate said set of pairs based on a predefined subset of the set of brightness values, said set of pairs and said subset being equinumerous.

13. A method for generating supply currents for supplying a plurality of LED channels, the method comprising, for each of the LED channels to be supplied:

generating a control signal for said LED channel based on a synchronization signal, which comprises periodic starting pulses, and on a combination of a magnitude dimming signal for said LED channel and a pulse dimming signal for said LED channel, wherein changes of said control signal come into effect only with a defined time offset with respect to one of the starting pulses of the synchronization signal; and generating, by means of a controlled current source dedicated to said LED channel, a supply current for said LED channel based on said control signal.

14. The method according to claim 13, wherein the time offset is different for each of the LED channels to be supplied.

15. The method according to claim 13, wherein, for each of the LED channels to be supplied, said control signal is a pulse-width modulated signal that is defined by a pulse amplitude, which depends on said magnitude dimming signal for said LED channel, and by a pulse duration, which depends on said pulse dimming signal for said LED channel.

16. The method according to claim 15, wherein all of the control signals generated for each of the LED channels have a common cycle length for each of the starting pulses, and each one of said control signals has an individual cycle start that is determined by the time offset for the LED channel to be supplied.

17. The method according to claim 16, wherein, for each of the LED channels to be supplied, a change of the pulse amplitude of said control signal comes only into effect with a respective cycle start of said control signal.

18. The method according to claim 15, wherein a ratio between the pulse duration of each control signal and a cycle length of said control signal is less than or equal to one.

19. The method according to claim 13, wherein the synchronization signal is a vertical synchronization signal of a video image separating video fields.

20. The method according to claim 13, wherein each of the periodic starting pulses of the synchronization signal indicates a beginning of a new signal period, in particular of a new image frame.

21. The method according to claim 13, wherein, for each of the LED channels to be supplied, a respective analog amplitude signal is generated based on the respective magnitude dimming signal, a respective pulse switching signal is generated based on the respective pulse dimming signal, on the synchronization signal and on the respective time offset, and the respective control signal is generated by modulating said analog amplitude signal with said pulse switching signal.

22. The method according to claim 13, wherein the time offset is preset, once-only or in an initialization phase, for each of the LED channels to be supplied.

23. The method according to claim 13, further comprising generating a set of pairs of a magnitude dimming signal and a pulse dimming signal, each pair of said set of pairs including the magnitude dimming signal for one of the LED channels to be supplied and the associated pulse dimming signal of said LED channel, based on a set of brightness values for each of the LED channels to be supplied.

24. The method according to claim 23, wherein said set of pairs is generated based on a predefined subset of the set of brightness values, said set of pairs and said subset being equinumerous.

* * * * *